UNITED STATES PATENT OFFICE.

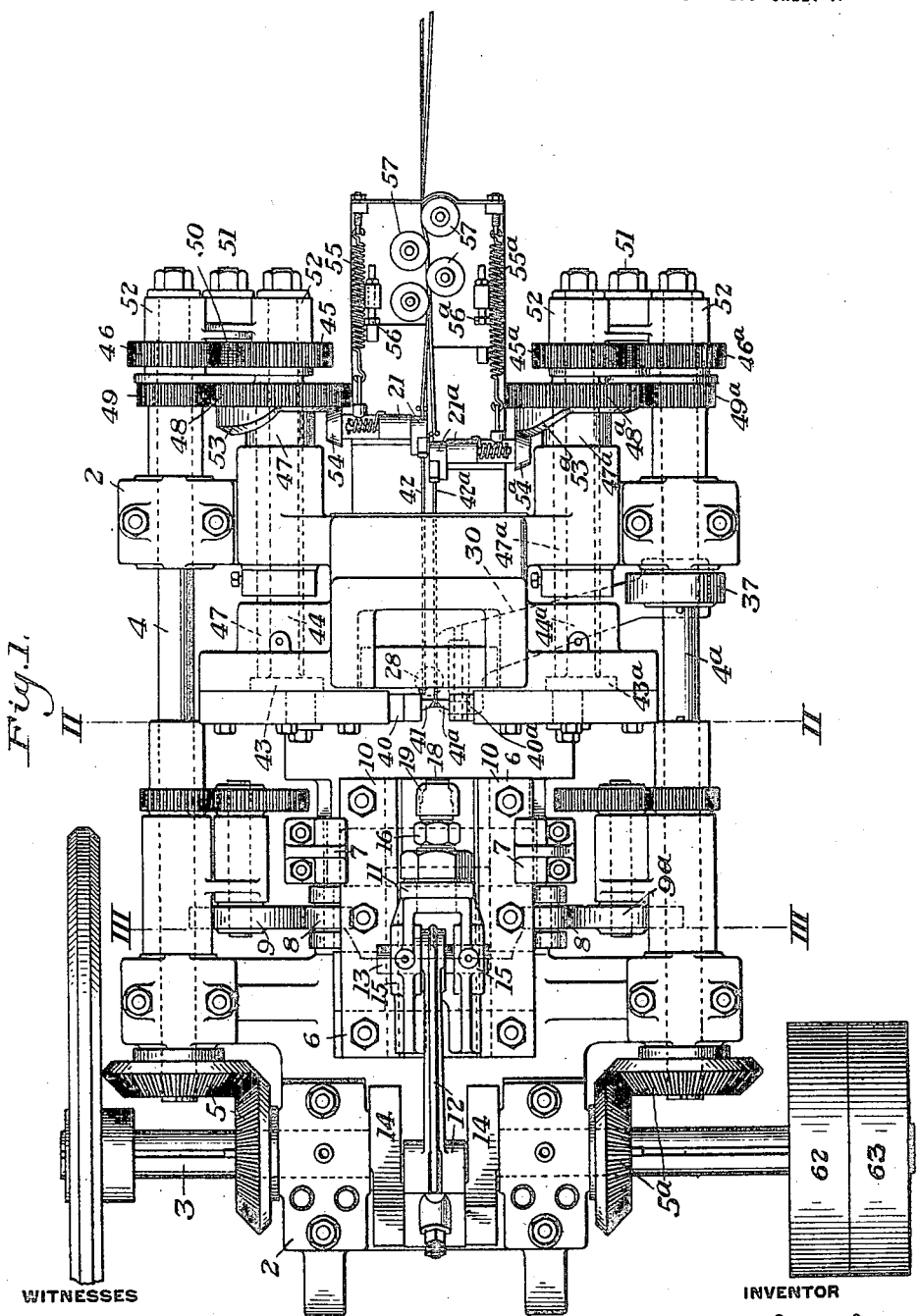

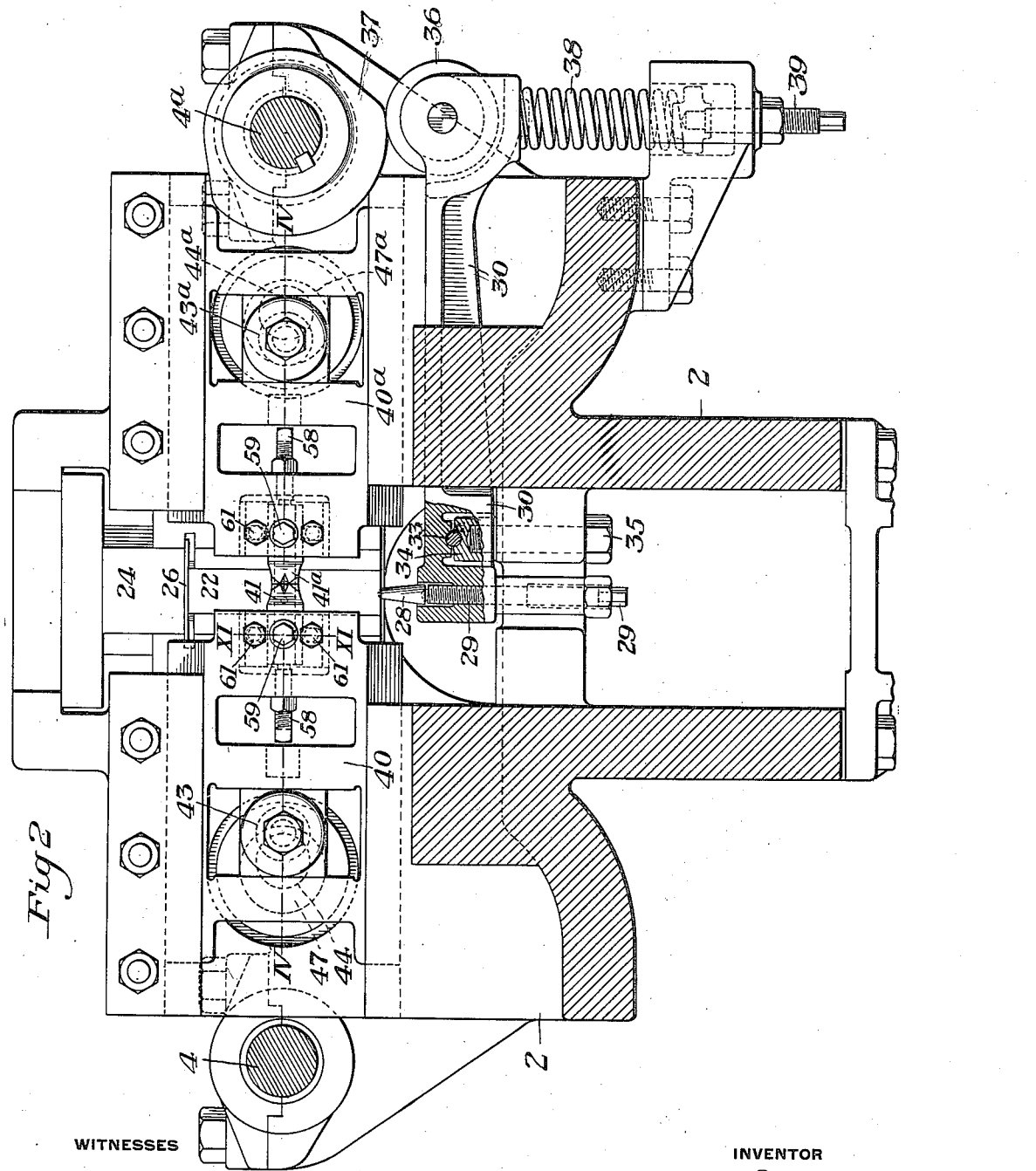

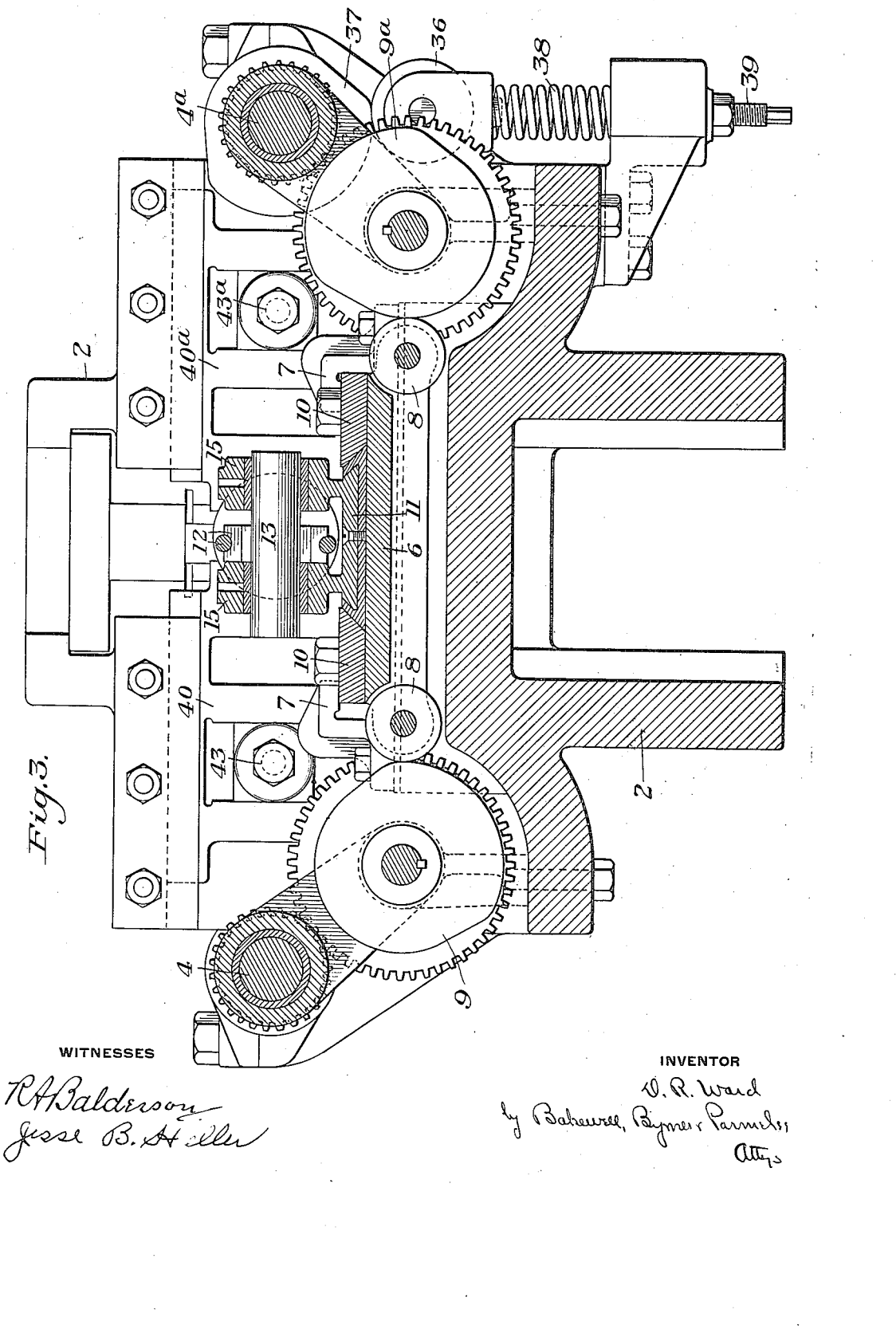

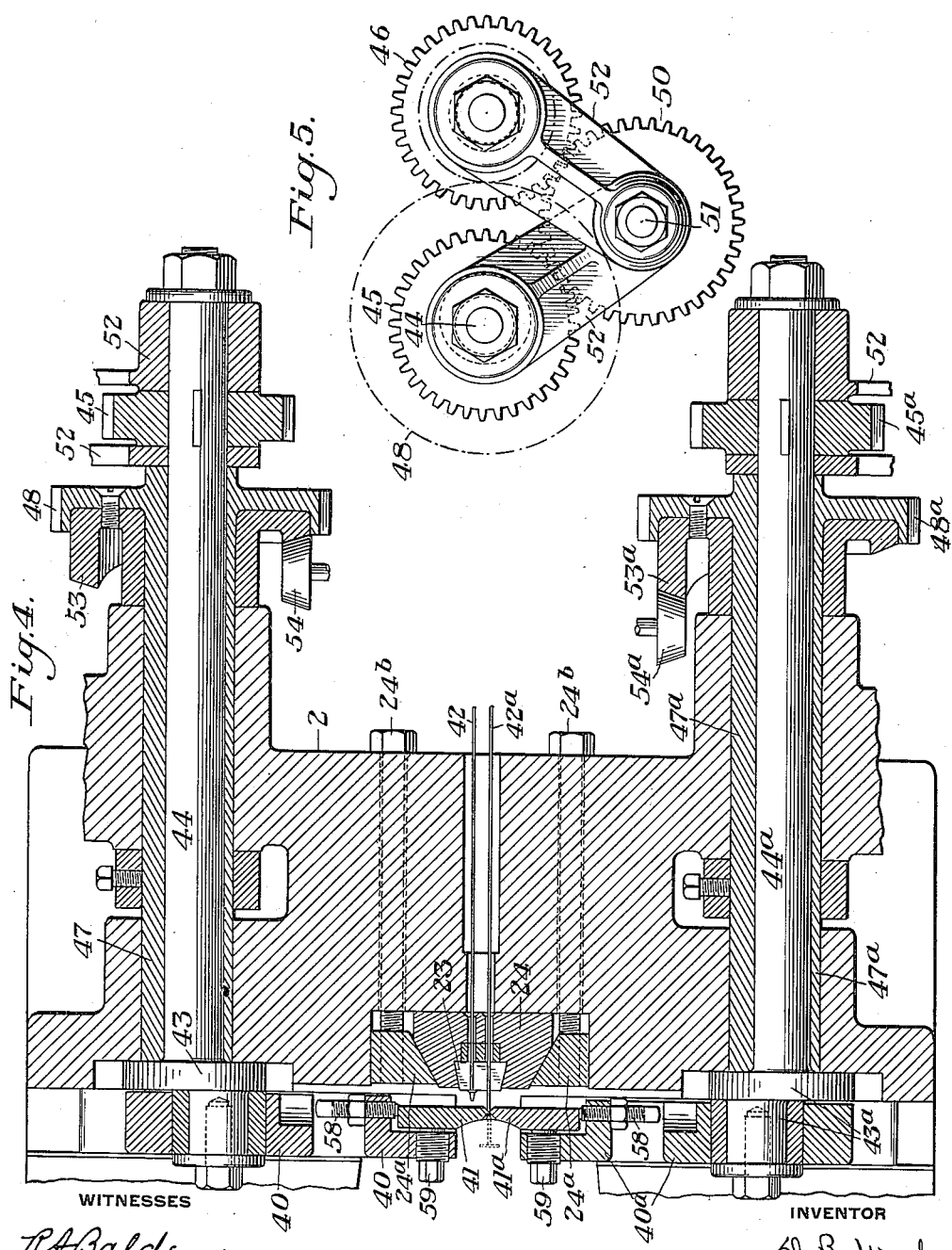

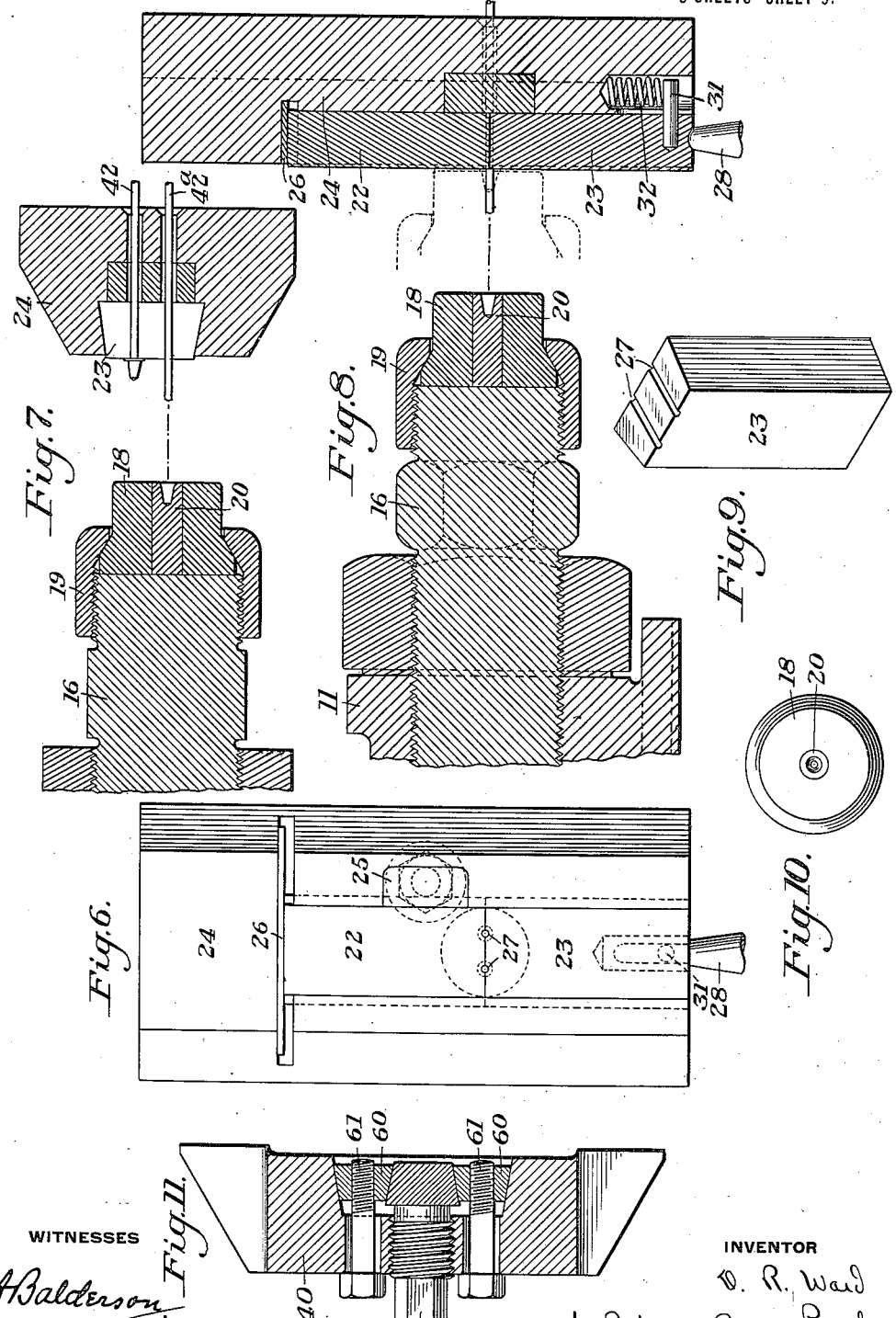

DAVID R. WARD, OF STRUTHERS, OHIO, ASSIGNOR TO THE WARD NAIL COMPANY, OF STRUTHERS, OHIO, A CORPORATION OF OHIO.

METHOD OF AND APPARATUS FOR MAKING HEADED ARTICLES.

1,402,027.  Specification of Letters Patent.  Patented Jan. 3, 1922.

Application filed May 24, 1918. Serial No. 236,418.

*To all whom it may concern:*

Be it known that I, DAVID R. WARD, a citizen of the United States, residing at Struthers, in the county of Mahoning and State of Ohio, have invented a new and useful Improvement in the Method of and Apparatus for Making Headed Articles, of which the following is a full, clear, and exact description, reference being had to the accompanying drawings, forming part of this specification, in which—

Figure 1 is a plan view of one form of machine embodying my invention.

Figure 2 is a sectional view on the line II—II of Figure 1.

Figure 3 is a similar view on the line III—III of Figure 1.

Figure 4 is a sectional view through a portion of the machine on the line IV—IV of Figure 2.

Figure 5 is an end view of the driving gears for one of the shear crank shafts.

Figure 6 is a face view of the stock clamping members.

Figure 7 is a detail horizontal sectional view through the heading die and the stock-holding members.

Figure 8 is a longitudinal sectional view of Figure 7.

Figure 9 is a perspective view of one of the holding members.

Figure 10 is an end view of the die, and

Figure 11 is a detail sectional view on the line XI—XI of Figure 2.

This invention relates to an improvement in the manufacture of headed articles, such as tacks, spikes, rivets, bolts and other headed articles, together with an apparatus for manufacturing such articles.

The object of my invention is to provide a cheap and efficient method and apparatus of this character, and which is more particularly designed for the manufacture of headed articles having a comparatively thin body portion and a relatively large head portion.

Another object of my invention is to provide a machine of this character whereby I am enabled to form headed articles of this type in a rapid manner and in which the head is formed by a plurality of operations, so as to form a head approximately central with relation to the body portion and heads which are uniform.

A further object of my invention is to provide a machine in which I simultaneously work on the heads of a plurality of articles, so that for each rotation of the machine, I am enabled to turn out a completed article.

A still further object of my invention is to provide duplicate feeding mechanism for the stock which will alternately feed two or more stock bars or rods to the heading devices, as well as provide a cutting device which is adapted to be shifted and will alternately cut off the two pieces of stock as they are fed forward after the completion of the article formed on the end of the stock.

In devices of this kind heretofore known to me, the stock or head of the article is usually upset at one operation, so that the head was liable to be mashed to one side of the center of the body of the article. By my improved method and apparatus, I first partially form the head by means of a recessed die, and then afterwards upset the partially formed head and complete the head on the end of the body of the article, so that the heads will be of regular shape and located concentrically with relation to the body of the article.

The precise nature of my invention will be best understood by reference to the accompanying drawings, which will now be described, it being premised, however, that various changes may be made in the details of construction of the apparatus without departing from the spirit and scope of my invention, as defined in the appended claims.

Referring to the accompanying drawings, the reference character 2 designates the frame of the machine, and 3 the main driving shaft rotatably mounted in suitable bearings on the main frame. 4 and 4ª designate counter-shafts, there being one on each side of the machine which are driven by bevel gears 5 and 5ª from the main shaft 3. 6 designates a transversely movable slide-block, which is adapted to move in guides 7 connected to the main frame 2, and connected to this slide block 6 are rollers 8 which engage cams 9 and 9ª on shafts on each side of the machine which are driven by gears on the shafts 4 and 4ª, respectively. The ratio of this gearing is such that the cams 9 and 9ª will only make one revolution for each two revolutions of the main shaft 3. Slidably mounted in guides 10 on the movable slide-block 6 is a crosshead 11, which is arranged to be reciprocated longitudinally by means of a pitman 12 connected to a pin 13. The other end of this pitman 12 is connected by means of cranks 14 to the main driving shaft 3, so that for each revolution of the main driving shaft 3, the crosshead 11 will make one reciprocation. The pin 13 is arranged to rotate in bearing members 15 on the crosshead 11. These bearings are also adapted to move longitudinally on the pin 13, or transversely of the machine, to permit the transverse movement of the slide-block 6. Connected to the end of the crosshead 11 is a removable plug 16, which has connected to the end thereof a die member. This die member comprises a head portion 18, which is shown as of cylindrical form, the one end thereof having a conical flange which is engaged by a threaded sleeve 19 for securing the head portion to the end of the plug 16. The central portion of the head 18 is bored out and seated within this bore is a recessed die portion 20, which is arranged to partially form the head, and which head is afterward completed by the face of the head member 18, as more clearly hereinafter described.

Slidably mounted in a longitudinal direction in suitable guides on the bed or frame 2 of the machine, are wire or rod feeding devices 21 and 21$^a$, which are arranged to grip the stock and feed it forward when moving in one direction and slide over the stock when moving in the other direction. The stock feeding devices will be more specifically described later on. These stock feeding devices feed the stock between pinch bars 22 and 23, in front of the heading die, previously described. The pinch bar 22 is mounted in a guide member 24 mounted in the frame of the machine, and is clamped thereto by means of a clamping member 25. 26 is a liner between the upper end of the pinch bar 22 and the holding member 24, the arrangement being such that the lower end of this pinch bar may be properly positioned in the machine. The pinch bar 23 is slidably mounted in the guide member 24, and is arranged to be reciprocated at the proper time in order to release the stock fed through the openings 27 formed between the ends of the pinch bars 22 and 23, one-half of each of these openings being formed in each of the members. The holding member 24 is adjustably secured in position in the frame 2 by means of wedges 24$^a$, which are secured by bolts 24$^b$.

The lower end of the pinch bar 23 rests upon the end of a connecting member 28 which, in turn rests on an adjusting screw 29 in the end of a pinch lever 30. Extending laterally from the pinch bar 23 is a pin 31, which extends into a recess, in which is seated a spring 32 which engages the end wall of the recess and the pin, for normally holding the pinch bar 23 against the connecting member.

The pinch bar lever 30 is fulcrumed at 33, and which fulcrum comprises a projection 34 on the end of a screw 35, and which is arranged to be adjusted to line up the recess therein with the recess in the lever 30. The projection 34 and the lever 30 are recessed for the reception of a pin, about which the lever is adapted to rock. The end of the lever 30 is provided with a roller 36 which is engaged by a cam 37 on the shaft 4$^a$, which is arranged to rock the lever 30 at the proper time to clamp the stock during the operation of the heading die to form the heads on the ends of the two pieces of stock. The roller 36 is held in contact with the cam 37 by means of a spring 38, the pressure of which can be adjusted by the adjusting mechanism 39 connected to a bracket mounted on the frame of the machine.

Slidably mounted in suitable guides on the frame of the machine are shear blocks 40 and 40$^a$, each of which has mounted therein a shear blade 41 and 41$^a$, which are arranged to alternately cut off the wires 42 and 42$^a$ fed forward by the stock feeding devices 21 and 21$^a$, respectively.

The shear blocks 40 and 40$^a$ are arranged to be reciprocated toward and from each other by cranks 43 and 43$^a$, respectively, and which cranks are connected respectively to shafts 44 and 44$^a$. These crank-shafts are connected to their respective driving shafts 4 and 4$^a$ by means of gears 45 and 45$^a$. These gears are in turn connected to gears 46 and 46$^a$ on the shafts 4 and 4$^a$, respectively, as hereinafter described. The ratio of this gearing is such that the crank shafts 44 and 44$^a$ will make one rotation for each rotation of the main shaft 3, so that the shear blades will be brought into contact with each other to shear off the stock after each reciprocation of the heading tool, and immediately after one of the pieces of stock has been fed forward.

In order to provide means for alternately shearing the stock bars 42 and 42$^a$, I provide the following devices:

Instead of journalling the crank shafts directly in the frame of the machine, they are journalled in sleeves 47 and 47$^a$, which sleeves are in turn rotatably mounted in bearings in the main frame. These sleeves are each provided with an eccentric bore, in which the crank shafts are journalled, and are set in such a manner that the centers of the crank shafts will be gyrated about the axes of the sleeves. The mechanism is so set that when the centers of the two crank shafts and the sleeves are in alignment with each other at one time, the shear blades will be moved into contact with each other in front of one of the stock pieces to shear said stock, and when moved into alignment with each other on the other throw, the two shear blades will be in contact with each other in front of the other stock member, so that the shears will alternately shear the blanks.

These sleeves 47 and 47$^a$ are connected to their respective driving shafts 4 and 4$^a$ by means of gears 48 and 48$^a$, which in turn mesh with gears 49 and 49$^a$ on their respective shafts 4 and 4$^a$. The gear wheels 49 and 49$^a$ are only one-half the diameter of the gears 48 and 48$^a$, so that the sleeves will only make one revolution for each two revolutions of the main driving shaft.

As before stated, the gear wheels 45 and 45$^a$ on the crank shafts are driven through the medium of the gears 46 and 46$^a$, but as the crank shafts are moved toward and from the shafts 4 and 4$^a$, these gears are not in direct mesh with each other, but are connected to each other through the medium of an idler gear.

The details of this construction is shown in Figure 5, in which an idle gear 50 is journalled on a fulcrum pin 51 of toggle levers 52, which are also fulcrumed on the shaft 4 and the crank shaft 44, the arrangement being such that the crank shafts 44 and 44$^a$ will be continuously in driving connection with their respective shafts 4 and 4$^a$, even though they are moved toward and from said shafts.

The feed slides or stock feeding devices 21 and 21$^a$ are advanced by means of cams 53 and 53$^a$, mounted on the gears 48 and 48$^a$, respectively. These slides are fed forward by means of these cams which engage rollers 54 and 54$^a$ on the respective feeding devices 21 and 21$^a$, so that said devices are always fed forward to a predetermined point. The feeding devices are returned to their rearward positions by springs 55 and 55$^a$, against adjustable stops 56 and 56$^a$. By this arrangement, the length of each feeding stroke may be readily adjusted by positioning the stops. The stock is fed between the usual rollers 57 from a suitable reel or other source.

The shear blades are each held in their blocks in a manner clearly shown in Figures 4 and 11. The end of each shear block is engaged by an adjusting screw 58, which is arranged to adjust the position of the point of one shear blade with relation to the position of the point of the other shear blade. 59 are backing screws for the shear blades for adjusting the shear blades toward and from the stock. The shear blades are locked in position by means of wedges 60, which are clamped against the tapered walls of the recesses in the shear blocks and against the tapered walls of the shear blades by means of screws 61, as clearly shown in Figure 11. The blades can be raised and lowered by the adjustment of the wedge blocks 60.

Connected to the main driving shaft 3 is a fast pulley 62 and a loose pulley 63, to which the driving belt for the machine is connected.

In the operation of the machine, the stock bars 42 and 42$^a$ are alternately fed forward by the feeding devices 21 and 21$^a$. In the drawings, as shown, the stock bar 42$^a$ has just been advanced and the shear blades actuated to cut off a formerly completed nail from the end of the stock bar 42$^a$, and the end of the stock bar 42 has been up-set by the previous operation. The die is now in position, shown in Figure 7, and is arranged to be advanced to partially form the head on the end of the stock bar 42$^a$ and to upset the partially formed head on the end of the stock bar 42. When the die recedes, the stock bar 42 will be advanced by its feeding device 21, and the feeding device 21$^a$ will recede to take a grip for the next feed, and as soon as the stock bar 42 has been advanced to the proper position, the shear blades 41 and 41$^a$ will be closed and also moved laterally, so that the blades will be central with relation to the stock bar 42 and shear off the formerly finished article. The shear blades are now retracted and the upsetting die is moved forward, and during the previous return movement and before engagement with the stock, the die will be shifted laterally by means of the cams 9 and 9$^a$ to bring the center of the recessed die portion 20 in front of the stock bar 42 to partially form the head on the end thereof, and to upset the partially formed head on the end of the stock bar 42. This operation will be repeated so that for each stroke of the die, one head will be partially formed and the other head will be completed, while one of the stock bars will be advanced and the finished article sheared from the end thereof.

The term "successively" as used in the claims, is used as including within its definition operations which are either successive when two, or more than two stock feeding means are employed, or alternate when only two stock feeding means are utilized.

The advantages of my invention result from the provision of a method and means for forming headed articles, in which the head is formed in a plurality of stages, in order to shape the heads uniformly and also to form headed articles having abnormally large heads in comparison to the sizes of their bodies.

A further advantage results from the provision of means for forming an article at each stroke of the machine, even though several operations are required for forming the head. A still further advantage results from the provision of movable shears for alternately cutting off the stock from different bars or rods after the completion of the articles on the end thereof, together with mechanism for closing the shears after each shift, together with means for alternately feeding the stock bars to the operating mechanism, said stock feeding means being provided with adjustable means for limiting the rearward movement of each stock feeding means whereby the length of the feed of the stock may be varied.

I claim:

1. A forging press having forging means for forming an elongated head on one piece of stock and finishing an elongated head on another piece of stock, means for holding both pieces of stock, means for moving the forging means toward and away from the stock for forging the ends of the stock, and means for relatively shifting the forging means with relation to the stock pieces to perform alternate forging operations on each piece of stock, substantially as described.

2. A forging press having two sets of stock feeding devices, means for alternately operating the stock feeding devices, means for partially forging the end of the one piece of stock and finishing the end of the other piece of stock, means for moving the forging means toward and from both pieces of stock, and means for relatively shifting the forging means and the stock to alternately partially forge and finish the end of each piece of stock, substantially as described.

3. A forging press having two sets of stock feeding devices, means for alternately operating the stock feeding devices, means for partially forging the end of the one piece of stock and finishing the end of the other piece of stock, means for moving the forging means toward and from both pieces of stock, and shearing means for alternately shearing the finished ends from the pieces of stock, substantially as described.

4. A forging press having two sets of stock feeding devices, means for alternately operating the stock feeding devices, forging means for simultaneously partially forming a head on the end of one piece of stock and finishing a head on the other piece of stock, means for moving the forging device toward and from the pieces of stock, means for shifting the forging device laterally between each forging movement, laterally movable shears arranged to be alternately moved into cutting relation with each piece of stock, and means for actuating said shears to alternately cut the finished ends from the pieces of stock, substantially as described.

5. A device of the character described, comprising a laterally movable slide block, means for moving said slide block, a forging device arranged to reciprocate on said slide block at right angles to the movement thereof, a pitman connected to said forging device, said forging device being arranged to be moved laterally together with the slide block with relation to the pitman, means for reciprocating the pitman, a plurality of stock feeding device for feeding stock to the forging device, means for alternately operating said stock feeding devices, and means for holding both of said stock pieces while being forged, substantially as described.

6. A device of the character described, comprising two stock feeding means, a die, means for reciprocating said die with relation to the stock feeding means, said die having an opening therein for partially forming the head on the end of one piece of stock and also another portion for finishing the partially formed head on the other piece of stock, and means for moving said die laterally between stroke, substantially as described.

7. A device of the character described, comprising two sets of stock feeding means, a single die, said die having a head forming recess therein and other portions for finishing the head, means for reciprocating said die, means for moving said die laterally with relation to the stock pieces so as to form a head by means of the recess on one stock member and to flatten a previously formed head on the other member, and means for alternately operating the stock feeding means, substantially as described.

8. A device of the character described, comprising two sets of stock feeding means, a single die, said die having a head forming recess therein and other portions for finishing the head, means for reciprocating said die, means for moving said die laterally with relation to the stock pieces so as to form a head by means of the recess on one stock member and to flatten a previously formed head on the other member, means for alternately operating the stock feeding means, a single shear for cutting the finished articles from the end of the stock, means for operating said shears after each stroke of the die, and means for shifting said shears between the strokes of the die to alternately cut finished articles from the stock bars, substantially as described.

9. A forging machine having stock feeding means for feeding a plurality of stock bars to the foregoing means, means for alternately moving said stock bars, shears arranged to alternately cut articles from one bar and then the other, means for shifting said shears from one stock bar to the other, and means for actuating the shears after each shift, substantially as described.

10. In a metal forging machine, a single forging means, a plurality of stock-feeding means for successively feeding one of a plurality of stock bars to said forging means, a plurality of cutter members, means for moving said cutter members toward and from each other, and means for shifting said cutter members to different positions to successively shear said forged bars, substantially as described.

11. In a metal forging machine, a single forging means, a plurality of stock-feeding means for successively feeding one of a plurality of stock bars to said forging means, a plurality of cutter members, crank shafts for operating said cutter members, said crank shafts being arranged to gyrate to shift the positions of the cutter members, and means for operating said crank shafts to shift the cutter members to different positions to successively shear said forged bars, substantially as described.

12. In a metal forging machine, a single forging means, a plurality of stock-feeding means for successively feeding one of a plurality of stock bars to said forging means, a plurality of cutting blades, crank shafts for moving said blades toward each other, said crank shafts being mounted in eccentrically bored sleeves, means to rotate the crank shafts in unison with each other, and means for rotating the sleeves to shift the positions of the shear blades to successively shear said forged bars, substantially as described.

13. A forging machine, comprising a forging die, a plurality of stock feeding devices, means for alternately actuating said feeding devices to feed the stock, means for reciprocating said die, and means for shifting said die laterally with relation to the stock pieces, substantially as described.

14. A forging machine, comprising a heading die, a crank shaft, a pitman connected thereto for actuating the heading die, a slide block on which the heading die is mounted, and means for moving said slide block laterally with relation to the pitman after each stroke of the die, substantially as described.

15. A forging tool having an opening for the reception of an upsetting member and a forging face surrounding said opening, and a removable upsetting member within said opening, substantially as described.

16. A forging tool, comprising a supporting member, a head portion, means for removably securing said head portion to the supporting member, said head portion having a tool receiving opening therethrough and a forging face surrounding the opening, and a forging tool removably seated in said opening, substantially as described.

17. A forging tool, comprising a supporting member, a head portion, means for removably securing said head portion to the supporting member, said head portion having a tool receiving opening therethrough and a forging face surrounding the opening, and a recessed forging tool removably seated in said opening, substantially as described.

18. A forging tool, comprising a threaded plug, a head portion having a flange, and a threaded sleeve for engaging the plug having an internal flange for engaging the flange on the head portion, substantially as described.

19. A forging tool, comprising a threaded plug, having a seating face on the end thereof, a head portion engaging said seat, said head portion having a central opening in an annular tapered flange, a threaded sleeve for engaging the threads on the plug and having a tapered seat for engaging the tapered flange on the plug, substantially as described.

20. A forging tool, comprising a threaded plug having a seating face on the end thereof, a head portion engaging said seat, said head portion having a central opening and an annular tapered flange, a threaded sleeve for engaging the threads on the plug and having a tapered seat for engaging the tapered flange on the plug, and a removable forging tool seated in said opening, substantially as described.

21. A forging machine having stock-feeding means for feeding a plurality of stock bars, a single forging means having a plurality of operative forging portions adapted to successively engage each of said stock bars for first partially and then completely forging a head thereon, means for successively shearing forged pieces from each of said bars, and means for successively moving said stock-feeding means, substantially as described.

22. A forging machine having stock feeding means for feeding a plurality of stock bars to a single forging means, and means for successively moving said stock feeding means, substantially as described.

23. A forging machine having stock feeding means for feeding a plurality of stock bars to a single forging means, means for alternately shearing forged pieces from the ends of the bars, and means for successively moving said stock feeding means, substantially as described.

In testimony whereof, I have hereunto set my hand.

DAVID R. WARD.